Feb. 2, 1960 S. D. ROBERTSON 2,923,901
HIGH FREQUENCY APPARATUS
Filed Nov. 29, 1955 4 Sheets-Sheet 1

INVENTOR
S. D. ROBERTSON
BY
Arthur J. Torsiglieri
ATTORNEY

INVENTOR
S. D. ROBERTSON
BY
Arthur J. Torsiglieri
ATTORNEY

INVENTOR
S. D. ROBERTSON
BY
Arthur J. Torsiglieri
ATTORNEY

Feb. 2, 1960 S. D. ROBERTSON 2,923,901

HIGH FREQUENCY APPARATUS

Filed Nov. 29, 1955 4 Sheets-Sheet 4

INVENTOR
S. D. ROBERTSON
BY
Arthur J. Torsiglieri
ATTORNEY

United States Patent Office 2,923,901

Patented Feb. 2, 1960

2,923,901

HIGH FREQUENCY APPARATUS

Sloan D. Robertson, Fair Haven, N.J., assignor to Bell Telephone Laboratories, Incorporated, New York, N.Y., a corporation of New York Application November 29, 1955, Serial No. 549,820

12 Claims. (Cl. 333—73)

This invention relates to microwave filters and more particularly to such filters of the finline type.

Finlines for coupling two or more waveguiding paths are disclosed in my copending applications Serial No. 485,671, filed February 2, 1955 and Serial No. 549,734, filed November 29, 1955, and in copending application Serial No. 485,672 by H. T. Friis and S. D. Robertson, filed February 2, 1955. Finlines comprise two thin conductive fin elements having cooperating edges which are generally spaced apart along their entire length for forming therealong a continuous wave path. The path along the interspace between the cooperating edges of the two fins is advantageously very narrow along the intermediate portion of its length for closely confining the propagating wave energy and is tapered at both ends for matching the characteristic impedance of the intermediate portion of the path to the respective characteristic impedances of the waveguiding paths being coupled.

Couplers of this type hold considerable promise for microwave transmission applications since they are inherently extremely broad-band devices. Additionally, the finline couplers are advantageously characterized in that they are polarization-selective, that is, a finline will couple only to electric fields extending in a plane parallel to the plane of its two fins, whereas electric fields polarized transverse to the plane of its fins will pass the finline substantially unaffected by its presence. In order to obtain polarization-selectivity it is to be noted that the fin elements must be extremely thin, for example in the case of a finline positioned within a circular hollow wave guide to form a coupler, the thickness of the fins must be a small fraction of the guide inside diameter, advantageously less than 5 percent of the inside diameter. Although such broad-band and polarization-selective characteristics make the use of finlines extremely desirable for many transmission applications, it is often advantageous in other applications to provide a particular frequency-selective characteristic.

A principal object of the present invention, therefore, is to realize prescribed frequency-selective characteristics in a finline.

A broader object of the present invention is to provide a frequency-selective microwave element which has polarization-selective characteristics and is characterized by simplicity of structure.

To these ends, a feature of the present invention is a finline comprising two thin conductive fin elements wherein reactance in the form of discontinuities in one or both of the fin elements is provided along the wave path for achieving desired frequency-selective characteristics. In particular, by appropriate forms of discontinuities, the added reactance may be made either capacitive or inductive over the frequency range of operation or alternatively may be made to resonate over the operating frequency range, whereby considerable flexibility in the frequency characteristics imparted is possible. The discontinuities may take the form of apertures in either or both of the fin elements or in protrusions into the wave path from either or both of the fin elements.

In one illustrative embodiment for achieving band-pass characteristics, a finline comprises two thin conductive fin elements spaced apart along first and second portions of their length for providing first and second segments of a wave path along the interspace between the fins and a third portion intermediate said first and second portions wherein the fins are shorted together by protrusions into the wave path. An aperture is provided in the finline adjacent the shorted section and in coupling relation with the first and second wave path segments. At frequencies in the range where the aperture is substantially resonant, energy is transferred via the resonant aperture between the first and second wave path segments, the resonant aperture acting effectively to by-pass the shorted section. At all other frequencies no energy can pass between the first and second wave path segments.

In a second illustrative embodiment for use as a band-elimination filter, a finline comprises two thin conductive fin elements spaced apart along their entire length for providing a wave path along the interspace between these elements. An aperture is provided in one or both fin elements in coupling proximity with the wave path. In the frequency range where the aperture is substantially resonant, wave energy passing in a given direction along the finline wave path is coupled to the aperture and then reflected back in a direction opposite to its initial direction of travel, thereby severely decreasing the amount of wave energy which continues through the finline wave path.

In another illustrative embodiment for use as a low-pass or high-pass filter, the finline comprises two thin conductive fin elements spaced apart along their entire length wherein one or both of the fins is provided with both slot-like apertures and protrusions into the wave path, the apertures and protrusions being appropriately arranged for achieving desired frequency-selective characteristics. In particular, low-pass filter characteristics are obtained by the use of two slot-like apertures, each less than a quarter wavelength at frequencies in the operating range, in one fin of a finline and a protrusion from one fin intermediate the two apertures. The apertures serve as series inductances whereas the protrusion together with the opposing fin forms a shunt capacitor. Similarly, high-pass filter characteristics can be obtained by an appropriate selection and arrangement of reactive components. Moreover, it can be appreciated that the low-pass and high-pass filters can be combined to give band-pass characteristics.

In a further illustrative embodiment of the present invention for use as a slow wave interaction circuit in a traveling wave tube, a finline comprises two thin conductive fin elements spaced apart along their entire length of which one or both of the fin elements is provided with a succession of slot-like apertures along a substantial portion of its length. Such an arrangement forms a simple structure having low-pass filter characteristics for serving effectively as a filter-type interaction circuit for the traveling wave tube.

The above and other objects, features and advantages of the present invention will be more clearly understood by referring to the following detailed description taken in connection with the accompanying drawing, in which:

Figs. 1A to 4A are longitudinal sectional views of modifications of one basic form of the present invention for use as band-pass finline filters for coupling two hollow conductive wave guides;

Figs. 1B to 4B are plots of the transmission loss characteristics of the couplers of Figs. 1A to 4A, respectively;

Figs. 5A to 8A are longitudinal sectional views of modifications of a second basic form of the present invention for use as band-elimination or band-rejection finline filters for coupling a main hollow wave guide with a branch wave guide;

Figs. 5B to 8B are plots of the transmission loss characteristics of the couplers of Figs. 5A to 8A, respectively;

Figure 14A:
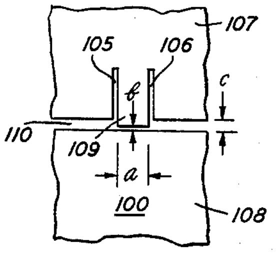
Figure 14B:
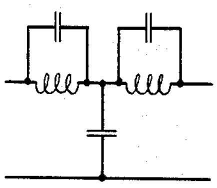
Figure 14C:
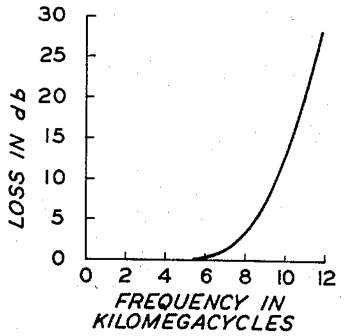
Figure 15A:
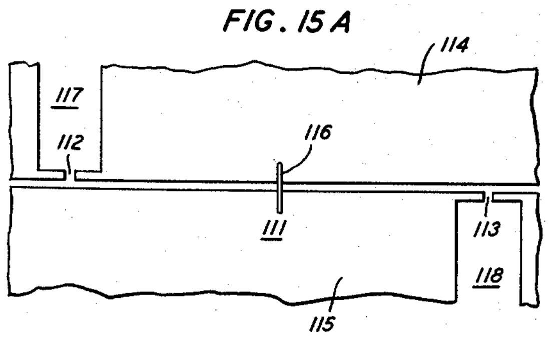
Figure 15B:
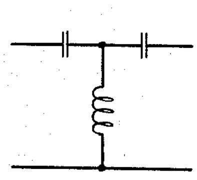
Figures 16, 17:
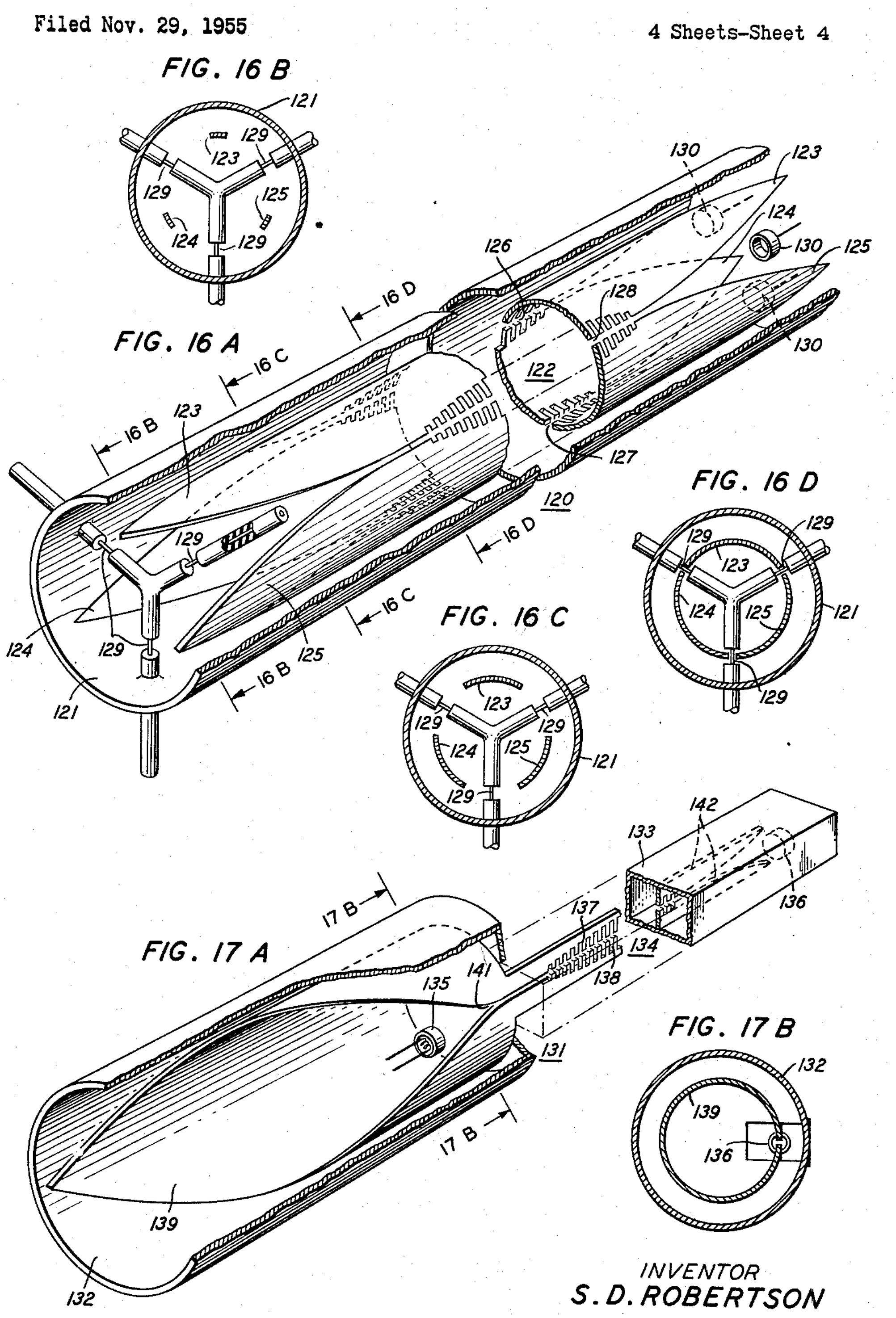

Figs. 14A, 14B, and 14C are a longitudinal sectional view of a further embodiment of the present invention for use as a low-pass finline filter, its equivalent circuit, and a plot of its transmission loss characteristics, respectively;

Figs. 15A and 15B are a longitudinal section of another embodiment of the present invention for use as a high-pass filter, and its equivalent circuit, respectively;

Fig. 16A is a cut-away perspective view of a traveling wave tube which, according to the present invention, utilizes a finline having low-pass filter characteristics as a slow wave filter-type interaction circuit;

Figs. 16B, 16C, and 16D are cross-sectional views of the tube of Fig. 16A looking to the left through planes B—B, C—C, and D—D, respectively;

Fig. 17A is a cut-away perspective view of a different form of a traveling wave tube which likewise utilizes a finline having low-pass filter characteristics as a slow wave filter-type interaction circuit; and Fig. 17B is a cross-sectional view of the tube of Fig. 17A looking to the left through plane B—B.

Figure 1A:
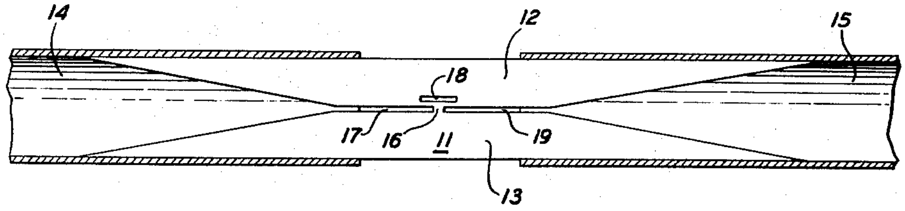

Referring now more particularly to the drawing, Fig. 1A illustrates a finline 11 having band-pass characteristics and comprising two thin coplanar conductive fins 12 and 13 for coupling together hollow conductive wave guides 14 and 15. The wave guides may be circular, rectangular, or other suitable shape in cross section with finline 11 positioined to extend along a longitudinal plane thereof parallel to a component of the electric field therein. For use with a wave propagating along one of such wave guides in a fundamental transverse electric mode, it is generally advantageous for the plane of the finline to include the axis of the wave guide. Fins 12 and 13 are shorted together along a portion of their length at region 16 by a conductive shorting section, which may be viewed as a protrusion from one or both of the fins, and an aperture 18 is provided in fin 12 adjacent the shorted region. To the left and right of shorted section 16, wave path segments 17 and 19, respectively, are provided along the interspace between fins 12 and 13. At frequencies in the range of resonance of aperture 18, substantial coupling takes place between the wave path segments 17 and 19 by way of the aperture.. Thus the coupling aperture 18, in effect, by-passes the shorted section 16 to form a completed wave path 17, 18, 19 between hollow wave guides 14 and 15. At frequencies outside this range, little coupling results between the wave path segments 17 and 19.

In operation, wave energy electrically polarized in the plane of finline 11, and passing from left to right along wave guide 14 will propagate along wave path segment 17, being transferred to aperture 18 if the frequency is appropriate, and then to wave path segment 19.

Figure 1B:
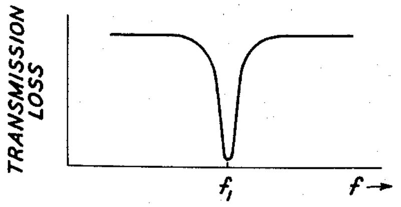

The transmission loss characteristics of the band-pass finline of Fig. 1A are shown in Fig. 1B. In the plot of Fig. 1B, the amount of attenuation or loss encountered by a wave in passing through the filter is plotted along the ordinate with frequency plotted along the abscissa. The loss is a minimum at frequency $f_1$, the resonant frequency of aperture 18. For the rectangularly shaped aperture shown in Fig. 1A, $f_1$ is the frequency at which the length of the aperture is approximately a half wavelength. At frequencies above and below $f_1$, the loss rises considerably so that no significant amout of wave energy will be transmitted through the filter at frequencies remote from resonance.

Figure 2A:
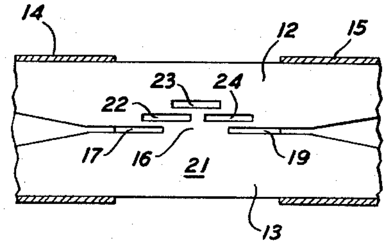

A modification of the coupler of Fig.. 1A is shown in Fig. 2A. Elements of this figure and subsequent figures which correspond to elements previously discussed with reference to Fig. 1 will be designated by like reference numerals. In this figure the single aperture of Fig. 1A is replaced by three apertures which, at resonance, serve to couple wave path segments 17 and 19, thereby completing a wave path between hollow wave guides 14 and 15. Apertures 22, 23, and 24 are conveniently made of equal length for greatest facility of analysis in predicting the operating characteristics of the coupler. This is not essential, however, and for some applications it may be desirable for the apertures to have slightly different lengths, and consequently slightly different resonant frequencies, giving a stagger tuning effect analogous to that ofter employed when coupling low-frequency tuned circuits.

In operation, wave energy electrically polarized in the plane of finline 21 and passing from left to right along wave guide 14 will propagate along wave path segment 17, being transferred, in turn, to apertures 22, 23, and 24 to the extent that the frequency is suited, and then to wave path segment 19, the apertures serving to bypass shorted region 16.

Figure 2B:
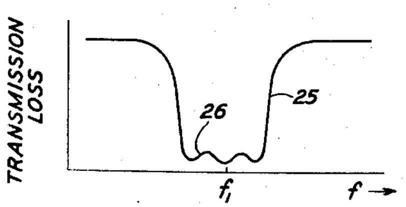

Fig. 2B shows the transmission loss curve for the filter of Fig. 2A. As shown by this figure, the loss is a minimum at frequency $f_1$, the resonant frequency of each aperture of Fig. 2A in the absence of coupling to the other apertures. The loss remains substantially constant at the minimum value for frequencies slightly above and below $f_1$ and then increases sharply. Thus the pass band of this filter-coupler extends over a wider frequency range than that of the coupler of Fig. 1A. For the transmission loss characteristic curve 25 shown, undulations exist over the pass band 26. Such undulations correspond to the case of overcoupling between the apertures of the filter and can be eliminated by increasing the spacing between apertures 22, 23, and 24 and between the apertures and wave path segments 17 and 19 to approach a condition of undercoupling.

Figure 3A:
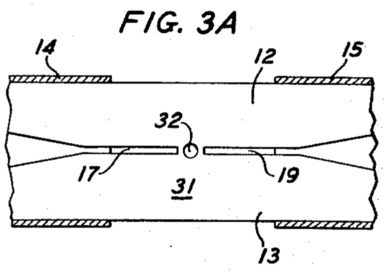

Fig. 3A shows an alternative modification of the finline coupler of Fig. 1A wherein the rectangular shaped aperture is replaced by a circular aperture. Operation of this filter is substantially the same as that of Fig. 1A, wave energy being transferred between wave path segments 17 and 19, via aperture 32 at its resonant frequency. Advantages of the circular aperture are ease in fabrication and accuracy of dimensioning. A circular hole of any desired diameter can readily be drilled through the finline 31 in coupling relation with path segments 17 and 19. An additional advantage is high-Q operation since the circular aperture, having no sharp corners, offers less attenuation at resonance than a rectangular aperture.

Figure 3B:
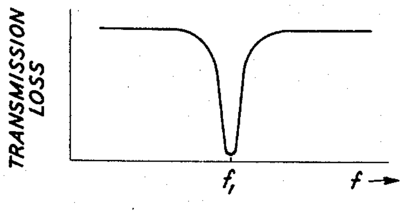

The transmission loss characteristics of the filter of Fig. 3A, as shown in Fig. 3B, is substantially the same as that of the filter of Fig. 1A, the minimum loss for a wave passing through the filter occurring at $f_1$, the resonant frequency of the circular aperture. This resonant frequency can be obtained from the expression $$f_1=\frac{c}{3.41a} \qquad (1)$$

where $c$ is the velocity of light, and $a$ is the radius of the aperture.

Figure 4A:
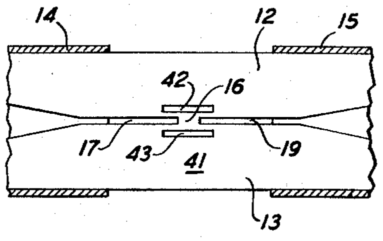
Figure 4B:
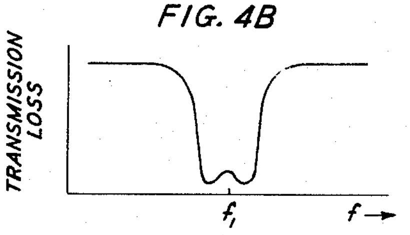

Fig. 4A shows a further modification of the bandpass finline filter of Fig. 1A. In this figure, two symmetrically disposed rectangular apertures 42 and 43 are utilized. In operation, wave energy polarized in the plane of finline 41 and passing from left to right along wave guide 14 is transferred via wave path segment 17 to apertures 42 and 43 at their respective resonant frequencies and then to wave path segment 19. It is generally desirable, although not essential, that slots 42 and 43 be of equal length. These apertures form two parallel paths, each of which by-passes shorted region 16. The transmission loss characteristic curve of this filter is shown in Fig. 4B, $f_1$ being the resonant frequency of the apertures. As explained with reference to Figs. 2A and 2B, the degree of coupling to the resonant apertures, and as a consequence the transmission loss curve can be modified by altering the spacing between apertures 42 and 43 and wave path segments 17 and 19.

As described in my above-mentioned copending application Serial No. 285,671, it is characteristic of coupling arrangements of the type described that either of wave guides 14 and 15 may be displaced vertically or horizontally out of axial alignment, or may be twisted, with respect to the other wave guide without affecting wave propagation therebetween, so long as fins 12 and 13 are not shorted undesirably along wave path segments 17 and 19. Once the propagating wave energy has been concentrated in the constricted wave path of the finline, the surrounding wave guide becomes substantially unnecessary. This property advantageously serves to adapt finlines for use as flexible coupling connections. Where convenient, however, it is desirable to extend wave guides 14 and 15 into physical contact so that the finline filter is completely enclosed by a conductive boundary. In such a case the enclosing wave guide serves to shield the coupling apertures thereby minimizing radiation therefrom at resonance. This reduction in radiation decreases the amount of loss of the filter at its resonant frequency and therefore affords a greater discrimination between frequency components in the range of resonance and those outside.

Figure 5A:
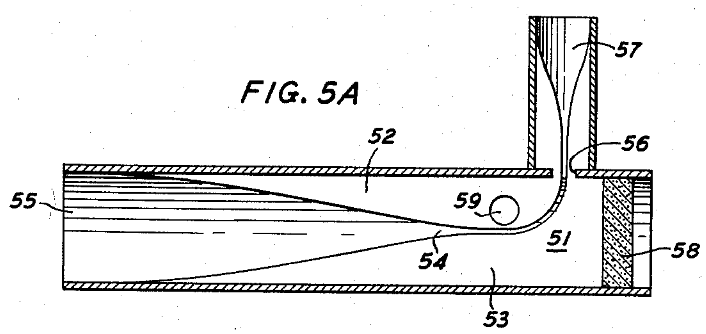

Fig. 5A illustrates a second basic form of the present invention for use as a band-elimination or band-rejection finline filter. Unlike the previously discussed finline filters which transmit signal energy freely over only a predetermined frequency band, the filter of Fig. 5A transmits freely signal energy at all frequencies except over a predetermined frequency band. The finline coupler 51 comprises two thin conductive fins 52, 53 spaced apart along their entire length for forming a continuous wave path 54 along the interspace therebetween. The transverse dimension of wave path 54 is initially equal to that of wave guide 55 and then tapers down to a relatively small dimension in its curved region for closely confining wave energy propagating therealong as it passes through aperture 56 into wave guide 57. After passing the junction of wave guides 55 and 57 the transverse dimension of wave path 54 is finally tapered out to that of wave guide 57. The tapered sections of wave path 54 serve to match the characteristic impedance of the narrow section of wave path to that of the respective wave guides and further to convert gradually from the wave guide propagating mode characteristic of the two hollow wave guides to the finline mode along the narrow section of wave path 54. A sheet 58 of dissipative material, which may conveniently comprise colloidal carbon deposited on a dielectric card, is positioned to be coplanar with finline 51 adjacent the right-hand end of fin 53 in wave guide 55. As discussed in the above-mentioned copending case, Serial No. 549,734, sheet 58 serves to eliminate spurious half-cylinder modes which tend to be set up along wave guide 55 on both sides of the finline.

Figure 5B:
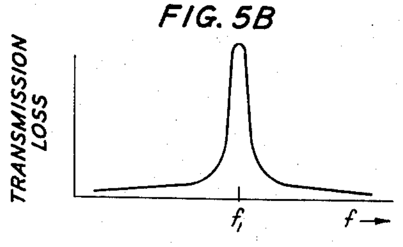

Circular aperture 59 is positioned in fin 52 in coupling proximity to wave path 54 and serves to couple selectively to a wave propagating in a given direction along that wave path and to reflect the energy of a wave so coupled back along the wave path in a direction opposite to its initial direction of travel. In order to insure adequate coupling between aperture 59 and wave path 54, it is desirable that the aperture be positioned extremely close to the wave path. For an aperture having a diameter of 1¾ inches, a spacing of 0.015 inch from the wave path has been found satisfactory. The amount of energy thus reflected is insignificant for most frequencies but increases sharply to a substantial value for frequencies in the region of aperture resonance. This reflection of energy results in a consequent attenuation or loss in the amount of wave energy which continues through wave path 54. The loss for such a wave, as shown by the transmission loss characteristic curve of Fig. 5B, is a maximum at $f_1$, substantially the resonant frequency of aperture 59, and decreases sharply at frequencies below and above resonance. The resonant frequency of aperture 59 can be determined from the Expression 1 above.

In operation a wave polarized in the plane of finline 51 and propagating from left to right along wave guide 55 will be coupled via the finline to branch wave guide 57 whereas a wave polarized transverse to finline 51 will pass substantially undisturbed through the region of the finline and dissipative sheet 58 and continue along wave guide 55. For wave energy coupled to the branch wave, the transmission loss will be substantial for frequencies in the range of resonance of aperture 59 and, consequently, wave components in this frequency range are effectively rejected and will not pass to the branch wave guide.

Figure 6A:
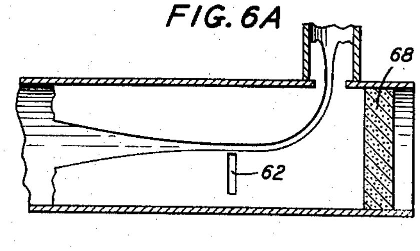
Figure 6B:
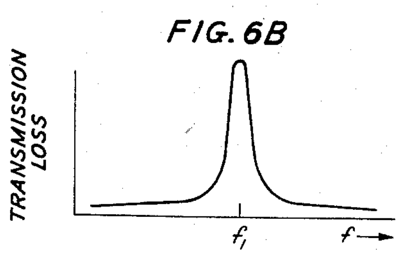
Figure 7A:
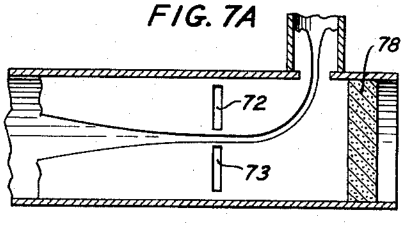
Figure 7B:
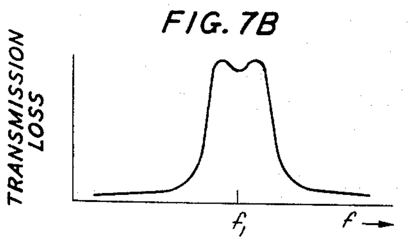
Figure 8A:
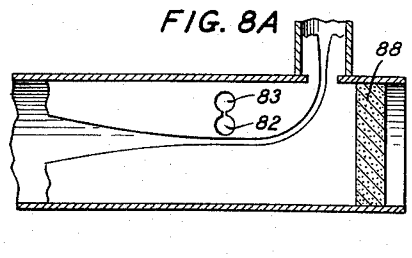
Figure 8B:
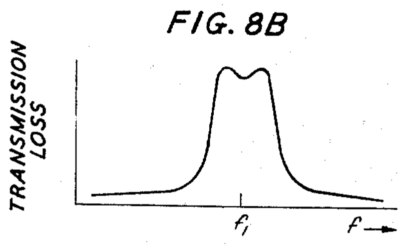
Figures 9, 9A, 10, 11, 12, 13:
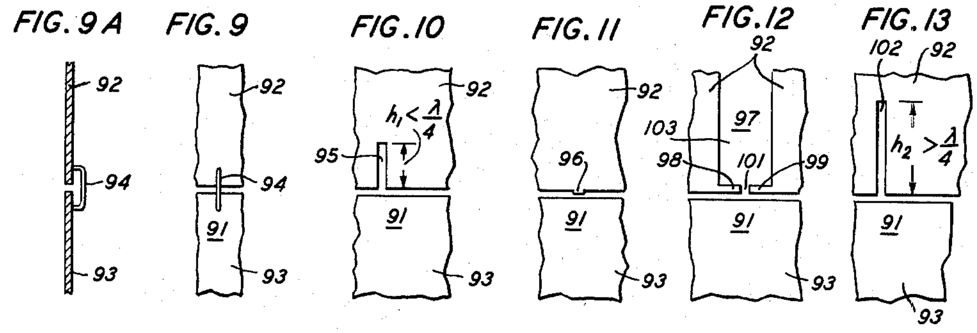
Figs. 9 to 13 show sections of finline in each of which there is included a reactance element, Fig. 9A being a cross-sectional view of Fig. 9.

Modifications of the coupler of Fig. 5A are shown in Figs. 6A, 7A and 8A and their corresponding transmission loss curves are shown in Figs. 6B, 7B and 8B, respectively. Elements of these figures which correspond to elements discussed with reference to Fig. 5A are designated by like reference numerals. In the coupler of Fig. 6A the circular aperture has been replaced by a rectangular aperture 62 having its longer dimension substantially perpendicular to wave path 54. The longer dimension need not be exactly perpendicular to the wave path but may be at some other desired angle. It is preferable, however, that it is not disposed parallel to the wave path. If the long dimension of the aperture be disposed parallel to wave path 54, the electric field vector of the wave energy coupled to the aperture will be perpendicular to its long dimension. As a result, at the frequency for which the long dimension of the aperture is a half wavelength, field vectors at one end of the aperture will be oppositely directed to those at the other end and hence will tend to cancel. Thus the strength of the field in the aperture is severely reduced at resonance whereby the effect sought is adversely affected. With the aperture positioned as shown in Fig. 6A, however, the electric field vector of wave energy is coupled to the aperture substantially at one end of the aperture only and no such problem exists. Operation of this coupler is substantially the same as that of the coupler of Fig. 5A, resonance of aperture 62 occurring at a frequency where its long dimension is approximately a half wavelength.

Fig. 7A is a modification of the coupler of Fig. 6A wherein the single aperture is replaced by two apertures 72 and 73, each of which resonates when its length is a half wavelength. These apertures may be of equal or unequal length. Since the operation of each aperture can be analyzed separately, equality in aperture length does not add measurably to the simplicity of analysis in predicting their operation. Each of these apertures, at resonance, couples to the wave propagating along wave path 54, the wave energy being coupled to its end adjacent path 54, and serves to reflect a substantial amount of the energy of the wave. As previously discussed, the coupling to each of these apertures, and as a consequence the shape of the transmission loss curve of Fig. 8B, can be changed by altering the spacing between the apertures and the wave path.

Fig. 8A is another modification of the coupler of Fig. 5A wherein the single circular aperture is replaced by two circular apertures 82 and 83 which are joined to form a dumbbell-shaped aperture. The coupling mechanism in this case is from wave path 54 to the first circular aperture 82 and then from that aperture to the second circular aperture 83. The operation of this coupler is substantially the same as that of the coupler of Fig. 7A, having the transmission loss characteristics shown in Fig. 8B, $f_1$, the resonant frequency of each of the circular apertures, can be obtained from Expression 1 above. It should be evident at this point that various other shapes and arrangements of apertures both for the band-elimination filter and the band-pass filter may be devised by one skilled in the art without departing from the spirit and scope of the present invention.

In each of the modifications discussed thus far, it can be appreciated that resonance of the apertures occurs not only at $f_1$, which represents the lowest resonant frequency, but also at high order resonances. For example, in the case of the rectangular apertures, resonance occurs not only when the aperture length is approximately a half wavelength but at higher frequencies which correspond approximately to integral multiples of a half wavelength. Accordingly, the finline coupler can be used in the manner described over frequency ranges including any one or more of these higher order resonances.

Figs. 9 to 13 show techniques for introducing reactance as desired along a finline by means of reactive elements. Filters employing various combinations of these reactive elements will be discussed below. Numeral 91 of these figures designates a typical finline, which may be employed in couplers of the type shown in Fig. 1A or Fig. 5A. Each finline comprises two thin conductive fins 92 and 93. The various reactive elements provided by the structural configurations are the following: in the arrangement shown in Figs. 9 and 9A, U-shaped conductive element 94 forms a shunt inductive element; in the arrangement shown in Fig. 10, slot-like aperture 95 of length less than a quarter wavelength forms a series inductive element; in the arrangement shown in Fig. 11, protrusion 96 together with the contiguous section of fin 93 forms a shunt capacitor; in the arrangement shown in Fig. 12, element 97 comprises contiguous portions 98 and 99 of fin 92 separated by spacing 101 to form a series capacitor; and in the arrangement shown in Fig. 13, slot-like aperture 102 of length less than a half wavelength but greater than a quarter wavelength forms a series capacitor. If it is desired that the finline of Fig. 12 be employed in a coupler of the type shown in Fig. 5A, so that the fin elements thereof are completely surrounded by a hollow wave guide, care should be taken that spacing 103 in fin 92 adjacent series capacitor 97 be made sufficiently large to avoid any undesired resonance thereof over the frequency range of operation. Apertures 95 of Fig. 10 and 102 of Fig. 13 can be filled with material having a fixed dielectric constant chosen for achieving desired reactive characteristics or, alternatively, they may be filled with a material whose dielectric constant varies with a change in electric current therethrough, and a suitable current source provided for achieving variable reactive characteristics. Likewise, dielectric material can be provided in the vicinity of the various other reactive elements for achieving desired fixed or variable reactive characteristics.

Fig. 14A is a combination of two series inductive elements and a shunt capacitor to form a low-pass filter. In this figure the length of slot-like apertures 105 and 106 is less than a quarter wavelength and consequently these apertures serve as series inductive elements. Between these apertures in fin 107 is positioned protrusion 109 to form a shunt capacitor across wave path 110 through finline 100. In practice, it may be desirable to position slot-like apertures 105 and 106 in opposite fins, for example by putting aperture 106 in fin 108, for further separating the apertures to minimize coupling therebetween. An alternative way of increasing the spacing between the apertures is to slant both apertures away from each other at their respective closed ends. The frequency-versus-attenuation characteristic of the low-pass filter corresponds substantially to that of the equivalent circuit of Fig. 14B, aperutres 105 and 106 serving as series inductance elements for frequencies where their length is less than a quarter wavelength and as series capacitors for frequencies where their length is between a quarter and a half wavelength. The loss or attenuation-versus-frequency characteristic curve shown in Fig. 14C was found experimentally for a filter of this type having the following dimensions:

| | Inches |
|---|---|
| Length of slot-like apertures | .268 |
| Width of slot-like apertures | .005 |
| Fin thickness | 1/16 |
| Length of protrusions (dimension $a$) | .05 |
| Spacing of protrusions (dimension $b$) | .0015 |
| Normal spacing between fins (dimension $c$) | .0135 |

Fig. 15A is an alternative combination of elements, including two series capacitors and a shunt inductive element, to form a high-pass filter. Capacitors 112 and 113 are located in fins 114 and 115, respectively, of finline 111. Interposed between these capacitors along the finline is a U-shaped conductive element 116 which serves as a shunt inductive element. The high-pass filter thus formed is substantially electrically equivalent to the circuit of Fig. 15B, having substantially the same attenuation-versus-frequency characteristics. Capacitors 112 and 113 are advantageously positioned in opposite fins, as shown, for increasing the distance between spacings 117 and 118 to minimize any coupling therebetween.

Various other combinations of the illustrated reactive elements can be devised by one skilled in the art for achieving desired filter characteristics without departing from the scope of the present invention. For example, the low-pass filter of Fig. 14A can be combined with the high-pass filter of Fig. 15A for achieving a band-pass filter. Additionally, the various finline filter arrangements may be employed in couplers of the type shown in Figs. 1A and 5A or in other finline coupling arrangements, such as those described in the above-mentioned copending applications.

Fig. 16A is an embodiment of the present invention in which a finline having low-pass filter characteristics is used as a slow wave filter-type circuit in a traveling wave tube. In this embodiment, circular hollow wave guide 121 serves as the evacuated envelope housing the elements of the traveling wave tube 120. Along the circular wave guide and concentric therewith is positioned a finline structure 122. This structure comprises arcuately shaped fins 123, 124, and 125, each of which is tapered at both ends to form tapered sections of wave path between adjacent fins. The manner of taper and the shape of the fins can perhaps be understood most clearly by referring to Figs. 16B, 16C, and 16D which are cross-sectional views of the tube of Fig. 16A taken through planes B–B, C–C, and D–D, respectively. Intermediate the tapered sections of wave path the fins are closely spaced to form narrow wave paths 126, 127, and 128. A succession of periodically spaced slot-like apertures is located in the fins along each of these narrow wave paths to form, in effect, three slow wave circuits in parallel, the apertures of each succession being of equal length along the major portion of the succession but being of gradually decreasing length toward the ends of the succession for impedance matching. At one end of the slow wave circuits thus formed is located an electron gun arrangement having three electron-emissive surfaces 129 and suitable beam focusing and accelerating electrodes (not shown) for directing the electrons from said emissive surfaces along three separate paths each in coupling relations with a different one of the three slow wave circuits. Electrodes 130 are located at the opposite end of the slow wave circuits for collecting electrons passing along the three respective electron paths. Additionally, magnetic focusing apparatus is advantageously provided along the length of the tube for maintaining the electrons focused along the three respective electron paths but has been omitted from the drawings for purposes of simplification.

In operation, a wave traveling from left to right in the fundamental transverse circular electric mode, generally designated $TE_{01}$, along hollow wave guide 121 will propagate along the tapered wave paths between the fins and continue along the narrow wave paths 126, 127, and 128 in the region of the slow wave circuits along the respective fins. The wave propagating along the succession of apertures of each slow wave circuit is amplified by the now well known process of cumulative interaction with the electron streams from emissive surfaces 129. This amplified energy is then transferred, via the tapered wave path sections at the right-hand end of the finline structure, and continues along the hollow wave guide 121. It is understood that in practice supports must be provided for maintaining finline structure 122 positioned concentrically within wave guide 121 and, further that wave guide windows must be provided in wave guide 121 at both ends of traveling wave tube 120 for maintainig evacuated conditions within the tube. It is also understood that wave energy propagating from right to left along hollow wave guide 121 can be amplified by traveling wave tube 120, under appropriate operating conditions, such amplification generally being referred to as backward wave amplification Figs. 17A and 17B illustrate a modification of the embodiment shown in Fig. 16A wherein the three slow wave circuits along the respective wave paths 126, 127, and 128 have been replaced by a single slow wave circuit 134. In this embodiment circular hollow wave guide 132 is abutted against rectangular hollow wave guide 133 and together they form an evacuated envelope for the traveling wave tube 131. As in the tube of Fig. 16A, it is understood that suitable wave guide seals are provided in both these wave guides for maintaining evacuated conditions along tube 131. Traveling wave tube 131 comprises the slow wave circuit 134 positioned along an axial plane of rectangular wave guide 133, an electron gun 135 and collector electrode 136 for projecting an electron stream in coupling relation with the slow wave circuit, and tapered sections of finline at the ends of slow wave circuit 134 for matching to rectangular wave guide 133 at the right-hand end of the circuit and to circular wave guide 132 at the left-hand end. The slow wave circuit constitutes a single pair of fins 137 and 138 having a succession of slot-like apertures along a portion of their length, the apertures being of equal length along the major portion of the succession and being of gradually decreasing lengths at the end portions of the succession for impedance matching. At the right-hand end of the slow wave circuit fins 137 and 138 are tapered to form a tapered finline section 142 for matching to rectangular wave guide 133 and for converting from the finline mode to a rectangular wave guide mode. At the left-hand end of the slow wave circuit the two fins become joined to form a cylindrically shaped conductor 139 having a longitudinal wave path 141 therethrough. Conductor 139 extends concentrically within circular wave guide 132 as shown in Fig. 17B, held by dielectric supports (not shown), and is so shaped that the transverse dimension of wave path 141 is increased gradually toward circular wave guide 132 for mode conversion and suitable impedance matching to the wave guide.

In operation a wave propagating in the transverse circular electric mode from left to right along wave guide 132 will pass along the tapered portion of wave path 141, continue through the slow wave circuit along the narrow section of the wave path, being amplified by cumulative interaction with the electron beam along the circuit, and finally pass through tapered finline section 142 to wave guide 133. It can be appreciated that the finline arrangement in the present tube comprising cylindrical conductor 139 and fins 137 and 138 serves effectively as a mode conversion section for transforming from a transverse circular electric mode in a circular wave guide to a rectangular wave guide mode, and further allows amplification of the wave during such conversion. As in the tube of Fig. 16A, the present tube 131 may also be used advantageously under appropriate operating conditions as a backward-wave amplifier for amplifying wave energy passing from right to left therethrough.

It is understood that the above-described arrangements are merely illustrative of the principles of the present invention and various other arrangements can be devised by those skilled in the art in the light of this disclosure without departing from the spirit and scope of the invention. For example, the finline filters of Figs. 1A–4A can be incorporated in couplers of the type shown in Figs. 5A–8A and the finline filters of Figs. 5A–8A can be incorporated in couplers of the type shown in Figs. 1A–4A. Moreover, dissipative material may be positioned in the various apertures of Figs. 5A–8A so that these apertures act to dissipate wave energy coupled thereto, rather than to reflect the wave energy as described. Additionally, the traveling wave tubes described can be suitably terminated at their respective downstream ends and operated as backward-wave oscillators in the manner of operation discussed by J. W. Sullivan in an article entitled "A Wide-Band Voltage-Tunable Oscillator" appearing in the Proceedings of the Institute of Radio Engineers, November 1954, at pages 168 et seq.

What is claimed is:

1. Apparatus for transferring high frequency wave energy between first and second waveguiding paths comprising a pair of thin coplanar conductive fin elements spaced apart along a major portion of their length and the interspace therebetween forming a connecting wave path between said first and second waveguiding paths, the transverse dimension of said connecting wave path being equal to that of the first waveguiding path at one end of the fins and being tapered therefrom to a smaller dimension along the portion of the wave path away from said end and being equal to that of the second waveguiding path at the oposite end of said fins and being tapered therefrom to said smaller dimension away from said opposite end, and at least one of said fins having an aperture therethrough adjacent the connecting wave path for forming a series impedance discontinuity in said wave path for imparting to said wave path frequency-selective characteristics.

2. In high frequency apparatus for effecting a wave energy transfer, conductively bounded means defining a hollow wave guide and forming a first waveguiding path, means defining a second waveguiding path, and coupling means for forming a connecting wave path between said first and second waveguiding paths comprising a pair of thin coplanar conductive fin elements which extend axially along a portion of the hollow wave guide and then out of said wave guide to connect with the second waveguiding path, the two elements having cooperating edges spaced apart along the major portion of their length for providing said connecting wave path therealong, the transverse dimension of said connecting wave path initially being equal to the transverse dimension of said hollow wave guide, then being tapered therefrom to a smaller dimension along the portion of said connecting wave path which extends outside said hollow wave guide, and finally being tapered from said smaller dimension to the transverse dimension of the second waveguiding path, and at least one of said fins having an aperture therethrough adjacent the smaller dimensioned portion of said connecting wave path for forming an impedance discontinuity in said wave path for imparting to said wave path frequency-selective characteristics.

3. In combination, means forming first and second waveguiding paths having predetermined transverse dimensions, and means for transferring wave energy between said waveguiding paths comprising a pair of thin coplanar conductive fin elements having opposing surfaces spaced apart along the major portion of their length for forming a connecting wave path between said first and second waveguiding paths, said opposing surfaces being spaced to form first and second tapered sections of wave path and a uniformly narrow section of wave path intermediate said tapered section, the first tapered section of wave path being positioned to form a continuation of the first waveguiding path and being tapered gradually from the transverse dimension of the first waveguiding path to the transverse dimension of the narrow section of wave path, and the second tapered section being positioned to form a continuation of the second waveguiding path and being tapered gradually from the transverse dimension of the second waveguiding path to the transverse dimension of said narrow section of wave path, and at least one of said fins having an aperture therethrough adjacent said narrow section of wave path for forming a series impedance discontinuity in said connecting wave path for imparting to said wave path frequency-selective characteristics.

4. A frequency band-pass filter comprising a finline including a pair of thin coplanar conductive fins spaced apart for forming a wave path along the interspace therebetween, means shorting the pair of fins for interrupting the wave path along an intermediate portion of its length, and means including an aperture in the finline adjacent the shorting means for forming a frequency-selective coupling element between the interrupted portions of wave path.

5. The combination of elements set forth in claim 4 wherein the aperture is circular in shape.

6. The combination of elements set forth in claim 4 wherein the aperture is rectangular in shape.

7. A frequency band-pass filter comprising a finline including a pair of thin coplanar conductive fins spaced apart for forming a wave path along the interspace therebetween, means shorting the pair of fins for interrupting the wave path along an intermediate portion of its length, and means including a rectangular aperture in one of said fins adjacent the shorting means for forming a frequency-selective coupling element between said portions of wave path, said rectangular aperture extending parallel to and overlapping the interrupted portions of wave path.

8. A frequency band-pass filter comprising a finline including a pair of thin coplanar conductive fins spaced apart for forming a wave path along the interspace therebetween, means shorting the pair of fins for interrupting the wave path along an intermediate portion of its length, and means including a plurality of apertures in the finline each of which is in coupling proximity with the interrupted portions of wave path for forming frequency-selective elements between said portions of wave path.

9. The combination of elements as set forth in claim 1 wherein the coplanar conductive fin elements are spaced apart along their entire length for forming a wave path along the interspace therebetween, one of said fin elements having an aperture therethrough in close proximity with said wave path.

10. The combination of elements set forth in claim 9 wherein said aperture is circular.

11. The combination of elements set forth in claim 9 wherein said aperture is rectangular in shape and has its long dimension substantially perpendicular to the wave path.

12. The combination of elements set forth in claim 9 wherein one of said fin elements has a plurality of apertures therethrough each of which is in close proximity with said wave path.

References Cited in the file of this patent

UNITED STATES PATENTS

| | | |
|---|---|---|
| 2,567,748 | White | Sept. 11, 1951 |
| 2,660,667 | Bowen | Nov. 24, 1953 |
| 2,683,256 | Kumpfer | July 6, 1954 |
| 2,691,731 | Miller | Oct. 12, 1954 |
| 2,708,236 | Pierce | May 10, 1955 |

FOREIGN PATENTS

| | | |
|---|---|---|
| 505,234 | Canada | Aug. 17, 1954 |